United States Patent [19]

Gartland et al.

[11] Patent Number: 5,527,407
[45] Date of Patent: Jun. 18, 1996

[54] APPARATUS AND METHOD FOR MARKING A RUBBER ARTICLE WITH A MESSAGE READABLE BY A LIGHT SCANNING DEVICE

[75] Inventors: Robert J. Gartland, Austintown; Gary T. Belski, Massillon, both of Ohio

[73] Assignee: The Goodyear Tire & Rubber Company, Akron, Ohio

[21] Appl. No.: 998,290

[22] Filed: Dec. 30, 1992

[51] Int. Cl.⁶ .......................... B32B 31/00; B32B 31/26; B32B 35/00
[52] U.S. Cl. .......................... 156/64; 156/116; 156/230; 156/235; 156/238; 156/256; 156/277; 156/361; 156/378; 156/379; 156/384; 156/510; 156/540
[58] Field of Search .................. 156/540, 541, 156/542, 64, 86, 234, 235, 238, 240, 277, 361, 116

[56] References Cited

U.S. PATENT DOCUMENTS

| | | | |
|---|---|---|---|
| 2,139,068 | 12/1938 | Bourdon . | |
| 2,984,596 | 5/1961 | Franer | 161/167 |
| 3,434,861 | 3/1969 | Luc | 156/234 |
| 3,761,725 | 9/1973 | Meyer | 235/494 X |
| 4,047,996 | 9/1977 | Kanzelberger | 156/234 |
| 4,086,112 | 4/1978 | Porter | 156/234 |
| 4,372,681 | 2/1983 | Sallenbach | 156/541 |
| 4,491,494 | 1/1985 | Davis, Jr. et al. | 156/241 |
| 4,536,434 | 8/1985 | Magnotta . | |
| 4,551,729 | 11/1985 | Kubo et al. | 346/76 PH |
| 4,645,555 | 2/1987 | Kuboyama . | |
| 4,680,457 | 7/1987 | Robertson | 235/471 X |
| 4,724,026 | 2/1988 | Nelson | 156/234 |
| 4,839,224 | 6/1989 | Chou et al. . | |
| 4,839,338 | 6/1989 | Marbrow | 427/146 X |
| 4,906,316 | 3/1990 | Seidl | 156/234 |
| 4,914,079 | 4/1990 | Takei et al. | 156/234 |
| 4,971,858 | 11/1990 | Yamano et al. | 428/323 |
| 4,978,146 | 12/1990 | Warther et al. . | |
| 5,047,110 | 9/1991 | Bryant et al. . | |
| 5,114,520 | 5/1992 | Wang, Jr. et al. | 156/540 |
| 5,133,820 | 7/1992 | Katayama et al. | 156/234 |
| 5,160,383 | 11/1992 | Gartland et al. | 156/116 |
| 5,264,066 | 11/1993 | Lundell | 156/362 X |
| 5,358,772 | 10/1994 | Nakagawa et al. . | |

FOREIGN PATENT DOCUMENTS

| | | | |
|---|---|---|---|
| 0249918 | 12/1987 | European Pat. Off. . | |
| 2460586 | 7/1976 | Germany . | |
| 54-69190 | 6/1979 | Japan | 156/116 |
| 60-187539 | 9/1985 | Japan | 156/116 |
| 62-152755 | 7/1987 | Japan . | |
| 63-87265 | 4/1988 | Japan . | |

*Primary Examiner*—David A. Simmons
*Assistant Examiner*—M. Curtis Mayes
*Attorney, Agent, or Firm*—Henry C. Young, Jr.

[57] ABSTRACT

An apparatus and method for supplying a graphic label that is readable with a light scanning device with such label placed on a rubber article. The graphic bar code label is optically interpreted with a bar code reader.

Thus, the cured substrate with the label with the graphic message is produced by using thermal transfer techniques. For this purpose, the ribbon in contact with the substrate passes by a print head and the ink can be selectively heated with this operation being synchronized by computer operation. When the ribbon is stripped away, the ink is left where heating occurred on the substrate material. The printed substrate exits and is cut to produce labels of desired length. The label is placed on a curable article and the label and substrate are subjected to curing conditions to effect transfer of the label to the cured substrate which may now contain the message in solely, alphanumeric, bar codes, human readable characters, and logos or mixtures of them. The bar code message is normally printed as a series of vertical bars and spaces of varying widths to supply the message in readable form with the light reflected from the series of varying width bars and spaces.

12 Claims, 5 Drawing Sheets

APPARATUS AND METHOD FOR MARKING A RUBBER ARTICLE WITH A MESSAGE READABLE BY A LIGHT SCANNING DEVICE

TECHNICAL FIELD

The invention herein resides in the art of marking cured substrate, such as a rubber tire, with a code, preferably a bar code, marking readable with a light or laser scanning device, said marking being capable when properly marked to furnish a history of the article from its so-called "birth to grave". Also, the message on the label or insignia cured to the plastic or rubber substrate can serve to identify the cured plastic or rubber and afford a logo such as may be used with the article alone or with the message or insignia.

BACKGROUND—ART

Heretofore indicia or decorations, including logos, have been applied to the sidewall of tires. For example, white sidewalls have been applied to tires, special identifying or grading codes have been placed on the sidewall of a tire for purpose of indicating grade, uniformity, identification of source, as well as decorations and the like have been used.

Generally, tires are marked using inks and paints that are commercially available. These marks are applied by stamping, stenciling, labeling or painting onto the tire with or without curing. Unfortunately, these markings on the tire may be washed off or smeared by abrasion. Also, the methods used heretofore were costly and were subjected to producing identifying indicia subjects to being disturbed, damaged or marred in use.

There is need in the art for simpler, inexpensive methods for imparting indicia to tires, especially with said indicia exhibiting high clarity, resolution, and preferably the indicia can be coded at the point of manufacture to carry its history from birth to grave as desired in the art with improved resistance to destruction, distortion and higher clarity.

SUMMARY OF THE INVENTION

An apparatus and method for supplying a graphic label that is readable with a light scanning device with such label placed on a rubber or plastic article. The graphic bar code label is optically interpreted with a bar code reader. The bar code reader consists of a scanning device and decoder logic. The scanner emits a light beam and detects light reflection. The dark bars absorbs the light and, thus, the absence of electrical signal, the light spaces reflects lights and generates an electrical signal. The electrical signal duration determines the width of the bars and spaces. The decoder logic subjects the signal to a comprehensive decoding algorithm which determines code type accuracy and validity. The scanned data can then be transmitted and/or stored. There is also two types of bar code readers, a visible laser scanner that detects a bar code based on light reflectance and an infrared scanner that reads a bar code based on the detection of carbon black or a similar pigment. The graphic label is adhered to an uncured or cured substrate such as a tire, a building bladder or other rubber articles by placing the graphic label on the curable substrate, preferably in a mold and effecting cure by pressure and heat or other curing conditions to cause the label to adhere to the cured article such as a tire.

Thus, the cured substrate with the label with the graphic message is produced by using thermal transfer techniques. For this purpose, the ribbon in contact with the substrate are passed between print head and pressure roll. The print head is composed of a grid of elements that are computer controlled to precisely heat and cool. The ribbon and label stock passes by the print head and the ink can be selectively heated with this operation being synchronized by computer operation. A combination of heat and pressure is applied to the ribbon in contact with the substrate which causes the ink to liquefy and transfer from the ribbon web to the label structure. When the ribbon is stripped away, the ink is left where heating occurred on the substrate material. The label is placed on a cured or curable article and the label and substrate are subjected to curing conditions to effect transfer of the label to the cured substrate which may now contain the message in solely, alphanumeric, bar codes, human readable characters, and logos or mixtures of them. The bar code message is normally printed as a series of vertical bars and spaces of varying widths to supply the message in readable form with the light reflected from the series of varying width bars and spaces.

The bar code itself is preferably a binary code with information encoded in the relative widths of bars and spaces in a printed pattern which is an optically read language. Bar codes are read by sweeping a small beam of light across the bar code. The light source may be a light pen with on light emitting diode/photo diode or a handheld and fixed laser scanner that uses a mechanically or electronically scanned light beam.

DISCLOSURE OF INVENTION

In light of the foregoing, an aspect of this invention is to furnish a method of applying a plastic or rubber substrate with a label that exhibit a message which can be read by reflective light preferably with a scanner.

It is the objective of this invention to provide for a logo insignia and/or bar code or other code on a tire or similar rubber object which yields a characteristic markings which are cosmetically acceptable in appearance and scannable which are not considered a foreign material to the article such as a paper label or a decal with a non-compatible adhesive.

A further aspect of this invention is to furnish an apparatus that allows the label to be generated by the operator at his work station to include a message which may indicate the current history of the specific cured article being formed. Said current history indicating its numerical sequence in the manufacturing process, and in some cases, its individual components. Thus, this invention provides apparatus for making a label from label stock and ribbon which the operator can use a keyboard via a computer to control the printing of the message including logos if desired, and securing or cutting the label in the desired lengths. Then the operator can place the label on the uncured substrate, preferably so the message transfers to the cured article is inverted but still be readable in the normal manner as by a scanner device or visual eye contact on the finished product.

Thermal transfer technology enables the user to print on-site, on-demand, variable information in human-readable and bar code form in acceptable quality and quantity. If the article to which the message is being transferred to is black, then the ink on the ribbon should be white or silver or any reflective type color. The thermal transfer equipment can then be programmed for the reverse printing of bar codes such that upon application to a black substrate, the printed white or silver bars would act as the reflective spaces between the non-printed black bars of the substrate backing for appropriate scanning capability.

DESCRIPTION OF THE DRAWINGS

For a complete understanding of the objects, techniques, apparatus structure and the method of placing an indicia and cured substrate with said indicia being readable by a scanner device in response to reflective light or electromagnetic radiation, reference should be had to the following detailed description and drawing wherein.

BEST MODE FOR CARRYING OUT THE INVENTION

Figure 1:
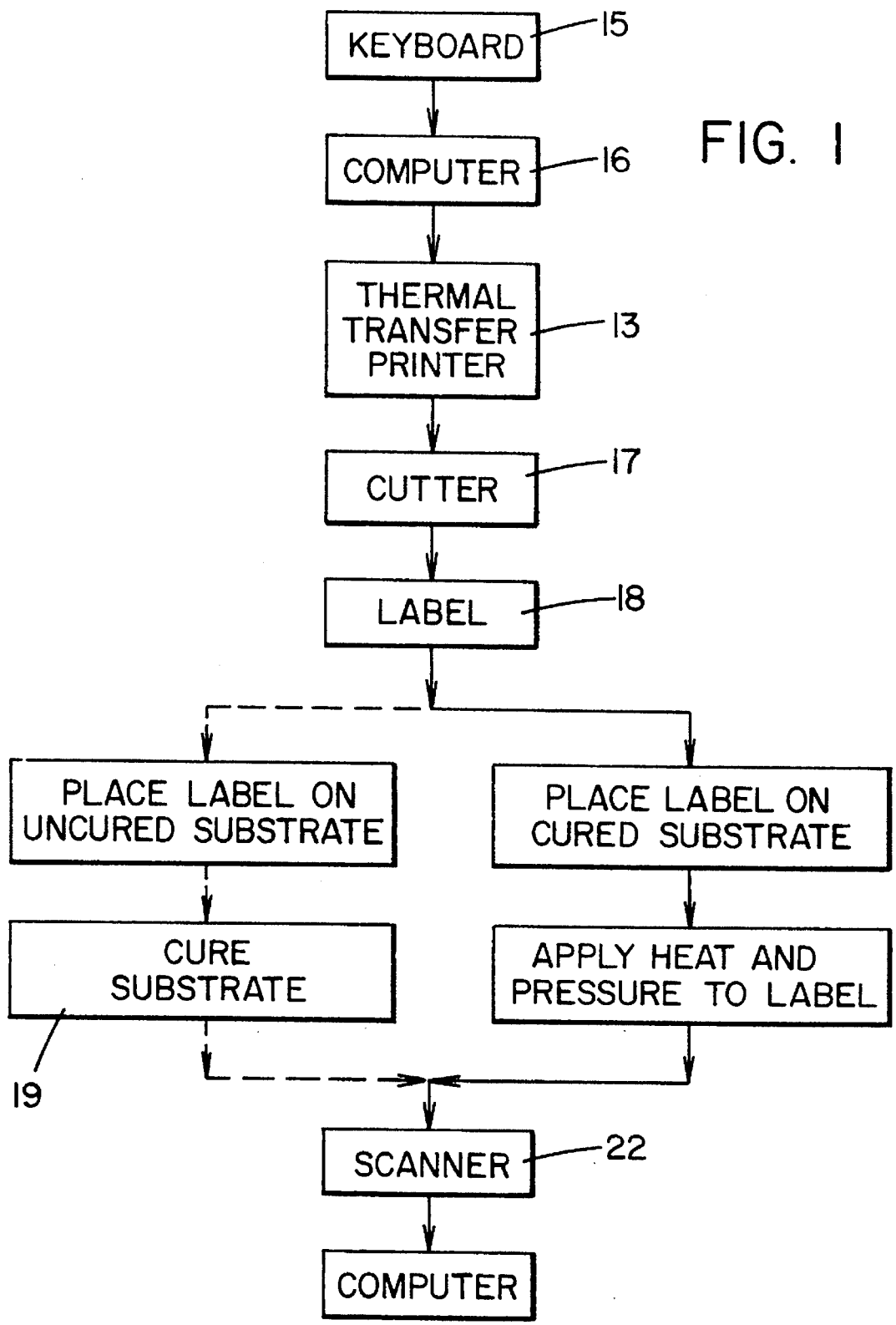
FIG. 1 is a block diagram of my novel method and apparatus.
Figure 1A:
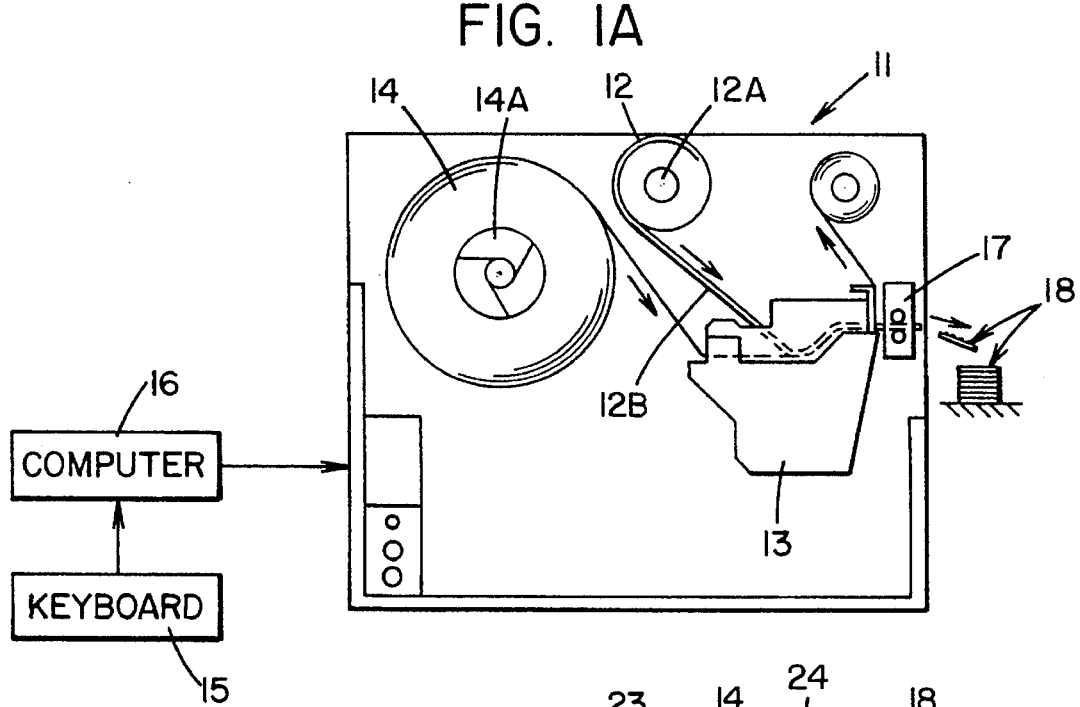
FIG. 1A is a schematic view of the apparatus for preferably performing various steps of the method.
Figure 1B:
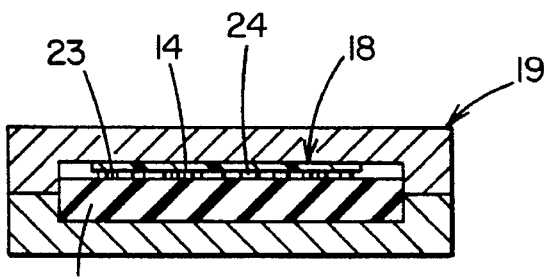
FIG. 1B is a schematic sectional view showing a thermal transfer printing step under heat/pressure.
Figure 1C:
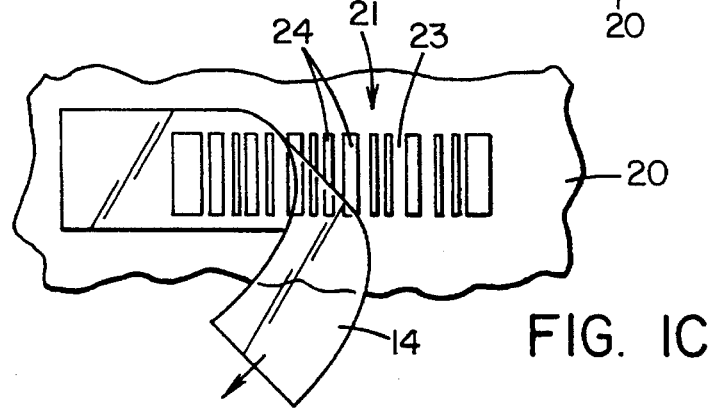
FIG. 1C is a sectional view of the curing station showing the protective substrate being removed.
Figure 1D:
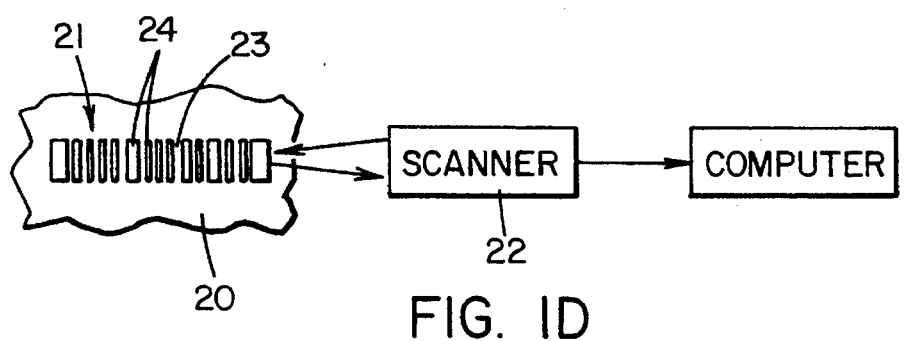
FIG. 1D is a sectional view of the station where the bar code scanning occurs.

Referring now to the drawing FIG. 1A, numerical 11 designated schematically one embodiment of the apparatus for practicing this invention. A thermal transfer printer 13 melts the ink 12B off a ribbon 12 onto the substrate 14. These types of printers produce excellent images and do not require specially treated substrates. The label stock 14 can be paper, plastics such as Mylar or rubber films. The numerical 12 designates a roll of ribbon on a support 12A that feeds to and through the printer assembly 13. The numerical 14 designates a roll of label stock on a support 14A that also feeds to and through the printer assembly. In response to an electronic message generated by the operator's activation of the keyboard 15 of a computer. The activation of the keyboard can be wired to send an electronic signal directly to the motor (not shown) of the printer assembly to cause the ribbon drive to advance the ribbon and substrate. The ribbon is advance due to tension on the ribbon from rotation of the drive wheels on rolls. Preferably, it is constructed so the activation of the keyboard by striking various keys to cause the computer 16 to synchronizely activated via the drive motor and the ribbon drive to advance the ribbon with the substrate through the printer. The computer activates the printer print head to print on the ribbon the indicia of the message typed by the operator. This message can be printed at any stage in manufacture and use of the article with a message thereon. A combination of heat and pressure is applied to the ribbon in contact with the substrate, which causes the ink 12B to liquefy and transfer from the ribbon web to the label substrate. When the ribbon is stripped away from the label structure, ink is left where heating occurred on the label material. Preferably, as the label substrate with the message thereon exits the print head 13, the computer can then cause the cutting member 17 to contact an anvil to cut the substrate to give a label 18 of the desired length.

In the heat pressure station 19, the label is inverted and placed on a curable substrate 20 and the curable substrate with the label 18 is cured in the customary way in the heat pressure station 19 such as a tire mold or related mold.

The cured substrate with the label cured or adhered thereto as shown by numerical 21 can be read either visually or by use of a scanning device 22. The scanning device 22 preferably emits a light or related electromagnetic radiation which strikes the label and is reflected back to be read by the scanner.

Thermal transfer ribbons-consists of at least two major elements, a carrier film and the transfer ink layer. The roll 12 of ribbon is preferably a laminate of desired width and thickness for securing it to the substrate. The laminate usually comprises a carrier or backing sheet of a polyester typically Mylar, Tedlar, High Density Polyolefin or other film or sheet materials about 4.5 microns (0.18 mils) to 5.7 microns (0.22 mils) and the ink layer.

This carrier sheet has an ink face coating of a suitable transfer stock such as any suitable thermoplastic elastomer, for example, a rubber, a hydrogenated styrene-butadiene block copolymer, a carnauba wax, an ester wax, or a suitable dry film ink. The coating usually has a thickness which is substantially less than that of the backing sheet face.

A method of printing a graphic message on a plastic or rubber substrate comprising activating an electronic system to advance a thermal transfer ribbon to a printer and electronically directing said printer to print a graphic message, severing or cutting said substrate to generate a label with a heat transferable message thereon, placing said label on a curable plastic or rubber substrate, curing said label on the curable plastic or rubber substrate, and later reading said graphic message.

Figure 2A:
FIGS. 2A–2B are plan views showing various forms of the finished messages may take.

The message on the printed label may consist of various groups of letters, numbers, logos and bars codes. The bar code itself is preferably a binary code with information, numbers, letters and symbols encoded in the widths of bars and spaces in an established pattern. The nature of one message is shown encoded in FIG. 2C. The logo of Goodyear is shown with a series of vertical bars 23 and spaces 24 with the width of the bars and spaces being adjusted to reflect the light so a message may be read. Also, the message of FIG. 2A has the number 03260108 to show other forms the message may take.

In a preferred embodiment of this invention where reverse printing of bar codes and/or mirror printing of other insignia are being used, a silver ink printed transfer ribbon gives unique results with black substrates such as a rubber stock loaded with carbon black. In this case, it is advantageous to have the printed silver ink bars act as the reflective spaces between the non-printed bar formed by the black loaded rubber backing material. Referring to FIG. 2C, the dark inks may be used for reverse printing on light or non-carbon black stocks.

It should be appreciated that the printing inks used in this invention are available commercially including silver colored ink.

Although the silver inks have been disclosed herein, it should be appreciated that the white inks made with white pigments, such as titanium oxide, may be used, too.

The logo can be printed on heat resistant Mylar film whose gauge can range from 1 mil to 20 mils thick using well known thermal transfer printing techniques and subsequently attached to a tire sidewall or position on a green tire prior to curing the article. The inked markings transfers directly to the rubber during heat application by a temperature controlled platen or curing. The label exhibits excellent dimensional uniformity on the finished part while the same Mylar film is protecting the heated platen surface or mold itself from the ink and protects the ink from platen/mold residue. The Mylar film can be removed or left on for surface protection.

An important concept for application is the mirror image printing of any insignia such that in using a white or silver ink thermal transfer ribbon; when transferred to a black surface, the distinguishing marks or logo are human readable.

Thermal printing techniques were successfully employed for label fabrication. For this purpose, the thermal transfer ribbons used are constructed of a polyester film carrier web that is coated on one side with a pigmented wax-based or resin-based ink. At the print head of the equipment, the ribbon is in constant contact with the label stock such as Mylar film. A combination of heat and pressure is applied to the ribbon which causes the ink to liquify and transfer from the polyester web to the label structure.

By design of the equipment, the inks flows from one dot to another resulting in very uniform lines and extremely crisp lines. The ink returns to its harden state immediately upon removal of the heat and pressure. When the ribbon is stripped away, ink is left where heating occurred on the label material or substrate. Thermal transfer printing devices can also be used for text and graphics applications since high density, sharp, crisp imaging is feasible. These units are suitable for centralized label production or on-demand printing in the factor at the operator's work station.

Particularly suitable for this label making is a personal computer having software that includes bit image data transfer. The preparation of graphics for inclusion in the bar code label consists of the following steps: (1) the image is read by an electronic scanner whose electronic signal is transferred to a computer such as a Macintosh® IIci to store and display the graphics; (2) the scanned image is stored in a TIFF file format for use in an IBM PC computer; (3) PC Paintbrush program is loaded in the IBM® PC computer and the file in TIFF format is saved to a PCX file format; (4) this PCX file is then converted into a hexadecimal format and subsequently transposed a negative image into a positive image.

This transposed hexadecimal graphic file is sent via the IBM® PC computer to the Zebra® 130 thermal transfer printer (having 512K RAM) for MEMORY storage. The equipment has a high resolution printhead preferably 8 dot/mm density which can yield superior graphics and bar code outputs. Finally the ZPL® (Zebra Programing Language) format is sent from the IBM® PC computer that include commands to call up the graphics and all ZPL® statements for text and bar codes for a unique label.

Figure 2B:
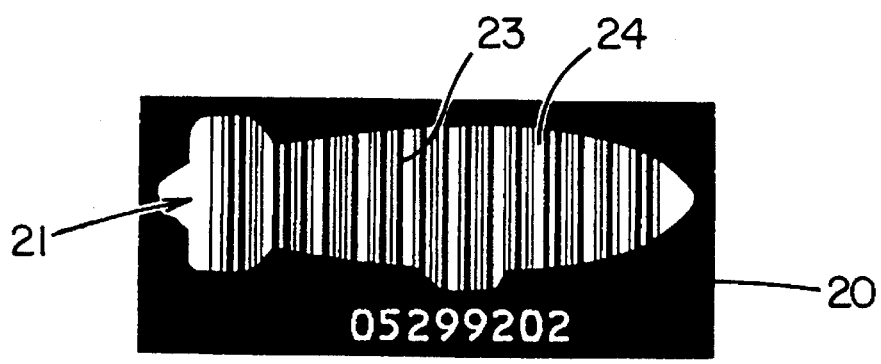
Figure 2C:
FIG. 2C is another view of a label showing an opaque message for use on a contrasting object.

For several applications, this unique label is printed on Mylar film 5 mils thick using a commercially available white (wax base) ribbon with the characters and/or graphics reproduced mirror images and the bar codes reverse printed such that the white bars act as the reflective spaces when applied to a black object (FIG. 2).

This invention may be practiced on so-called green rubber applications or cured rubber applications.

Figure 3A:
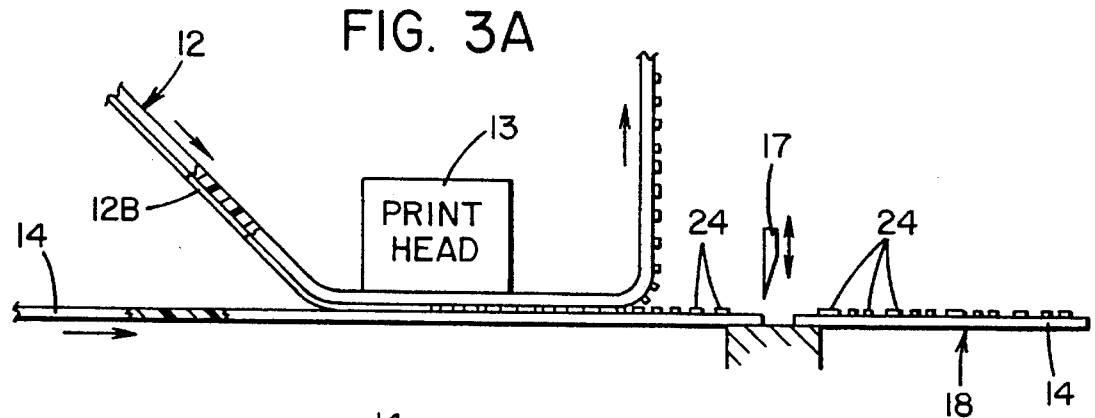
FIGS. 3A–3E are detail views showing steps required for forming a label and application to a green rubber object.
Figure 3B:
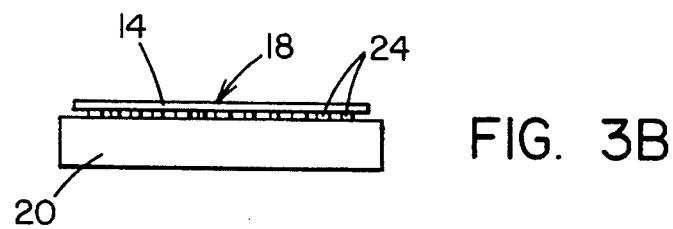
Figure 3C:
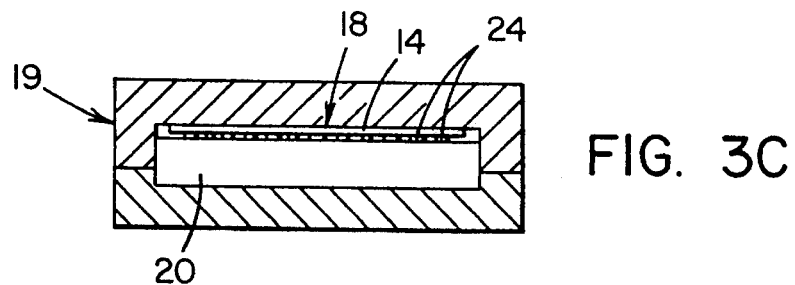
Figure 3D:
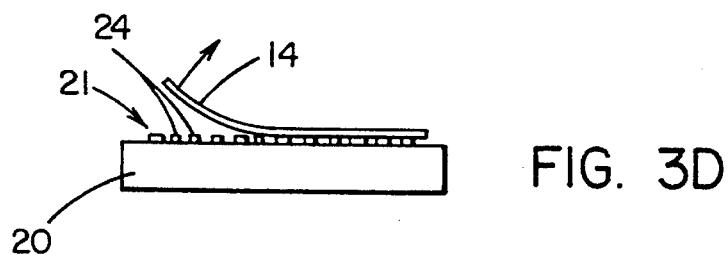
Figure 3E:
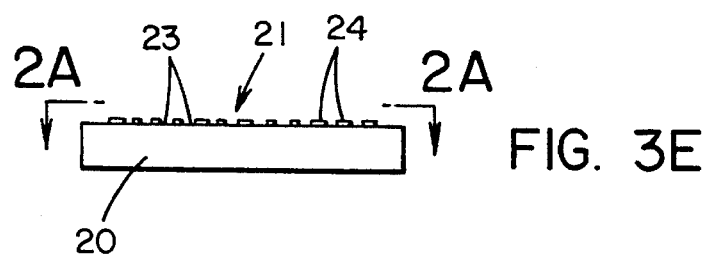

In green rubber application, the steps referring
1) printing the label identification on the surface of a heat-resistant label material such as Mylar film with the characters reproduced as mirror images and bar codes reverse printed;
2) FIG. 3B: positioning the label to an appropriate location on an uncured rubber article such as a green tire of FIG. 3B: or in a mold with the ink surface facing the rubber surface; and
3) curing the green rubber article such as a tire in a heated mold i.e. in FIG. 3C for a specified period of time and temperature such that the bar code ink is selectively transferred and bonded to the outer surface of the rubber article.

Figure 4A:
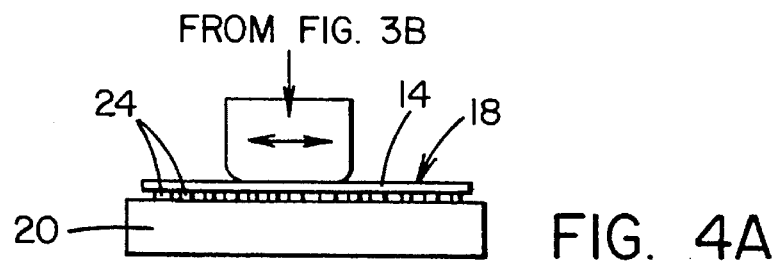
FIGS. 4A–4C are schematics sectional view showing steps required for attaching a label to a cured object.
Figure 4B:
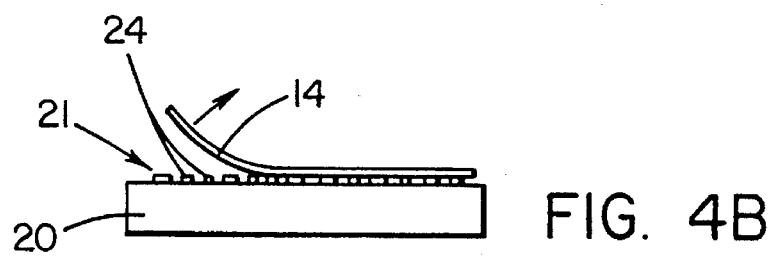
Figure 4C:
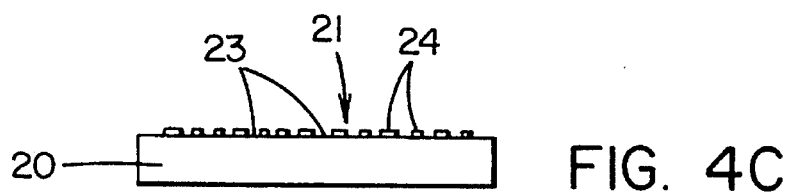
Figure 5A:
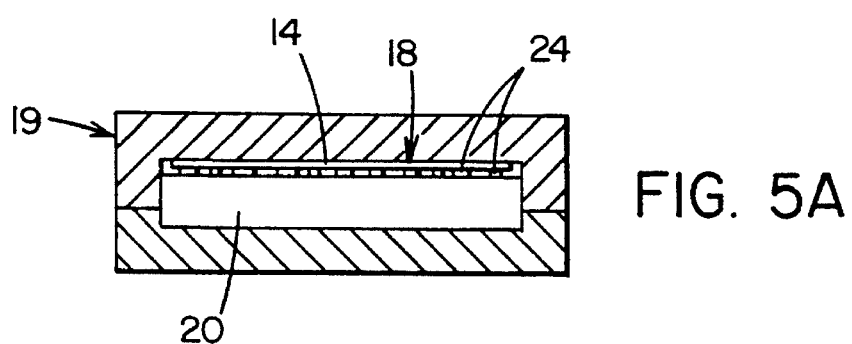
FIGS. 5A–5B are detail views similar to FIG. 3C and FIG. 3E showing a label may emboss a green object.
Figure 5B:
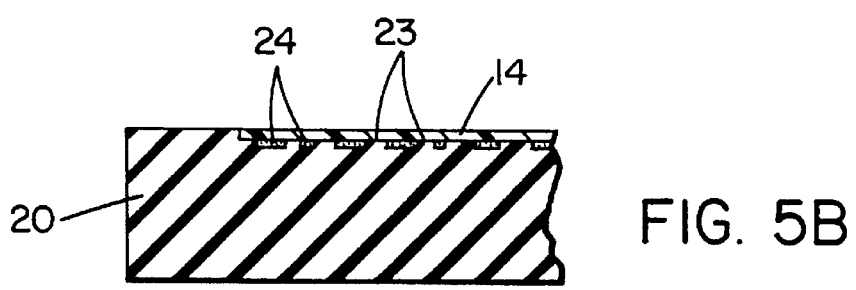

In the cured rubber application, the steps are as shown in FIG. 3A again:
1) printing the label identification on the surface of a heat-resistant label material such as Mylar film with the characters reproduced as mirror images and bar codes reverse printed;
2) then as seen in FIG. 3B positioning the label to a cured rubber article such as a cured tire with the ink surface facing the rubber substrate; and now referring to FIG. 4A–4C:
3) effecting the transfer of the ink by the uniform application of heat (250° F.–300° F.) and pressure (300°–500° psi) for a short time (15–30 seconds) such as by the use of a heated iron.

It is believed that the heat resistant Mylar film stabilizes the insignia information during transfer such that a precise label is obtained on the tire or rubber product. The film also protects the heated platen or mold surface from any contamination. The ink that is used in the thermal printing process is the same ink that is transferred to the tire or rubber product after the application of heat. The same capability is possible with text, graphics and bar codes.

The unique labels can be printed using a conventional thermal transfer printing techniques and utilizing a heavy pigmented, light color (white/silver) thermal transfer ribbon. The use of a heat resistant substrate such as Mylar film remains undistorted in processing (printing and transfer) and its contrast is unchanged during end use application. Labels can be printed at the tire building station or other areas upon demand which eliminates inventory and logistics problems with preprinted labels or mix-ups during transport to the application point. Practicing this technique result in sharp, crisp well defined logos of distinguishing markings on a rubber surface with its method of application being relatively simple and versatile.

This invention intends that the label may be updated at any time during its life, for instance, when the tires are brought in to be recapped.

While certain representative embodiments and details have been shown for the purpose of illustrating the invention, it will be apparent to those skilled in this art that various changes and modifications may be made therein without departing from the spirit or scope of the invention.

What is claimed is:

1. Apparatus for marking a cured rubber substrate with a graphic message that can be read by a scanning unit including:

a means to hold a thermal transfer ribbon and advance said ribbon to a printer on demand from a signal from an electronic means, said printer contacting said ribbon to print a heat transferable graphics on a substrate;

means to sever or cut said substrate to give a label on a curable rubber article;

means to subject said label on said curable rubber article to curing conditions in a curing means to transfer a graphic message to said curable rubber article; and a means to read light reflected from the message on the cured rubber article.

2. The apparatus of claim 1 wherein the means of the apparatus is capable of holding and advancing a ribbon of a heat resistant polyester film whose gauge is less than 1 mil with a silver or white pigmented thermal ink coating.

3. The apparatus of claim 1 wherein the substrate is a heat resistant polyester film whose gauge is from 1 to 20 mils thick and capable of receiving a heat transferred ink graphic.

4. The apparatus of claim 1 herein the label is placed on the curable rubber article to effect a mirror image transfer of the graphics on the label to the rubber article and reverse transfer of a bar code to the rubber article.

5. The method of labeling a tire comprising the steps of:
   making a label in a tire building station by
   (1) activating a means to advance a heat transfer ribbon to and through a print head,
   (2) activating said print head to selectively heat a portion of the ribbon to produce a message on a substrate consisting of a film of polyester or thin rubber in response to the direction of the workman of said station and
   (3) severing said substrate with the message to produce a label;
   placing the message of said label on and in contact with an uncured tire in said station;
   curing said uncured tire in a mold with pressure and temperature to get a cured tire having the message transferred to said cured tire; and
   then reading to identify the message on the tire.

6. The method of claim 5 wherein the label is placed on said uncured tire to reverse print a bar code label, on said tire by mirror image transfer of the graphics on the label to the tire during said curing.

7. The method of claim 6 wherein the message is readable by a scanner that is activated by reflected electromagnetic radiation.

8. The method of claim 7 wherein any reflection of the electromagnetic radiation supplies an electrical input to a computer to store said input and allow said input to be printed in a print form.

9. The method of claim 5 wherein the label is placed on a black curable rubber tire to reverse print a white or silver bar code label to the rubber tire, wherein the printed silver or white bars act as the reflected spaces between the non-printed bar formed by black loaded rubber backing material of the rubber tire.

10. The method of claim 9 wherein the message is readable by a scanner that is activated by reflected electromagnetic radiation.

11. The method of claim 10 wherein any reflection of the electromagnetic radiation supplies an electrical input to a computer to store said input and allow said input to be printed in a print form.

12. A method of placing a graphic message on a cured tire comprising:
   providing a tire builder at a tire building station with an apparatus for the builder to advance a thermal link transfer ribbon through a printhead and activation means that controls advance of said transfer of said transfer ribbon;
   advancing said ribbon thereby;
   directing an activation means to control the printhead to print a graphic message on a substrate;
   severing said substrate to give a label;
   placing said label on an uncured tire;
   curing said uncured tire to transfer the graphic message from the label to said cured tire; and
   then reading the graphic message on said cured tire.

* * * * *